United States Patent
Warren

(10) Patent No.: US 10,661,643 B1
(45) Date of Patent: May 26, 2020

(54) BRIGHT STRIP RETENTION CLIP ASSEMBLY

(71) Applicant: COOPER-STANDARD AUTOMOTIVE INC., Novi, MI (US)

(72) Inventor: Larry Warren, Bloomfield Hills, MI (US)

(73) Assignee: COOPER-STANDARD AUTOMOTIVE INC., Novi, MI (US)

( * ) Notice: Subject to any disclaimer, the term of this patent is extended or adjusted under 35 U.S.C. 154(b) by 136 days.

(21) Appl. No.: 15/588,310

(22) Filed: May 5, 2017

Related U.S. Application Data

(60) Provisional application No. 62/332,063, filed on May 5, 2016.

(51) Int. Cl.
| | |
|---|---|
| *E05D 15/16* | (2006.01) |
| *B60J 10/36* | (2016.01) |
| *B60J 10/15* | (2016.01) |
| *B60J 10/00* | (2016.01) |
| *B60J 10/33* | (2016.01) |

(52) U.S. Cl.
CPC ............. *B60J 10/36* (2016.02); *B60J 10/15* (2016.02); *B60J 10/33* (2016.02); *B60J 10/45* (2016.02)

(58) Field of Classification Search
CPC ... B60J 10/36; B60J 10/33; B60J 10/15; B60J 10/45
USPC ....................................... 49/441, 440, 475.1
See application file for complete search history.

(56) References Cited

U.S. PATENT DOCUMENTS

| | | | |
|---|---|---|---|
| 4,197,688 A | 4/1980 | Mauer | |
| 5,146,658 A | 9/1992 | Devismes | |
| 5,743,047 A * | 4/1998 | Bonne | B60J 10/00 49/441 |
| 6,409,251 B1 * | 6/2002 | Kaye | B60J 10/265 296/146.9 |
| 6,679,003 B2 * | 1/2004 | Nozaki | B60J 5/0402 49/441 |
| 6,681,526 B2 * | 1/2004 | Mueller | B60J 10/265 49/377 |
| 6,742,304 B1 * | 6/2004 | Mueller | B60J 10/265 49/377 |
| 6,944,917 B2 | 9/2005 | Yanagita et al. | |
| 8,205,389 B1 * | 6/2012 | Kesh | B60J 10/235 49/440 |
| 8,302,350 B2 * | 11/2012 | Lee | B60J 10/87 49/440 |

(Continued)

*Primary Examiner* — Jerry E Redman
(74) *Attorney, Agent, or Firm* — Fay Sharpe LLP

(57) ABSTRACT

A weatherseal assembly, and the associated method, is adapted for receipt on an associated vehicle, and includes a first attachment portion for securing the weatherseal to the associated vehicle, and a protrusion facing outwardly from the weatherseal. An elongated reveal is dimensioned for receipt over the weatherseal protrusion and faces outwardly from the vehicle when mounted thereon. The reveal has a substantially C-shape. A clip is dimensioned for interconnecting the reveal to the weatherseal protrusion, and the clip includes a retention portion that is movable between different, first and second positions such that in the first position, the retention portion has a first dimension when the reveal engages the clip, and in the second position, the retention portion has a different, second dimension when the reveal is engaged to the clip for securing the reveal to the weatherseal assembly.

10 Claims, 4 Drawing Sheets

(56) References Cited

U.S. PATENT DOCUMENTS

| | | | |
|---|---|---|---|
| 8,677,572 B2 | 3/2014 | Scroggie et al. | |
| 8,819,997 B2* | 9/2014 | Bouvatier | B60R 13/04 |
| | | | 49/440 |
| 8,919,846 B2* | 12/2014 | Maass | B60J 5/0402 |
| | | | 296/1.08 |
| 9,003,709 B2* | 4/2015 | Patterson | B60J 10/75 |
| | | | 49/377 |
| 9,114,693 B2* | 8/2015 | Prater | B60J 10/88 |
| 9,168,878 B2 | 10/2015 | Bozinovski | |
| 9,290,083 B2* | 3/2016 | Mass | B60J 10/18 |
| 9,840,208 B2* | 12/2017 | Choi | B60J 5/0405 |
| 9,931,922 B2* | 4/2018 | Morioka | B60J 10/32 |
| 9,963,088 B2* | 5/2018 | Yoshida | B60J 10/30 |
| 2008/0030046 A1* | 2/2008 | Krause | B60J 10/79 |
| | | | 296/146.2 |
| 2009/0151266 A1* | 6/2009 | Shumulinskiy | B60J 10/365 |
| | | | 49/489.1 |
| 2009/0183435 A1* | 7/2009 | Daio | B60J 10/36 |
| | | | 49/493.1 |
| 2010/0011670 A1* | 1/2010 | O'Sullivan | B60J 10/78 |
| | | | 49/489.1 |
| 2011/0061307 A1* | 3/2011 | Braeuherr | B60J 10/17 |
| | | | 49/475.1 |
| 2013/0031842 A1* | 2/2013 | Murree | B60J 10/30 |
| | | | 49/492.1 |
| 2013/0074417 A1* | 3/2013 | Kawai | B60J 10/85 |
| | | | 49/490.1 |
| 2015/0089878 A1* | 4/2015 | Otsuka | B60J 10/88 |
| | | | 49/440 |
| 2017/0001504 A1* | 1/2017 | Takeda | B60J 10/27 |
| 2017/0001505 A1* | 1/2017 | Fukuta | B60J 10/32 |

* cited by examiner

BRIGHT STRIP RETENTION CLIP ASSEMBLY

This application claims the priority benefit of U.S. provisional application Ser. No. 62/332,063, filed May 5, 2016, the entire disclosure of which is expressly incorporated herein by reference.

BACKGROUND

This invention relates to a weatherstrip assembly, such as used around the perimeter of a window opening formed in an automotive vehicle door. More particularly, the weatherstrip assembly includes a bright strip or reveal that faces outwardly from the vehicle as a show surface, although selected aspects of the present disclosure may find use in related applications and environments.

It is known in the industry to provide a weatherstrip or weatherseal assembly that extends around perimeter portions of an opening in a door, and seals a perimeter portion of a window that opens and closes relative to the door opening. A mounting portion of a weatherseal assembly typically engages or is secured to a flange formed for example by joined portions of inner and outer door panels. Commonly, the weatherstrip is an extruded or co-extruded EPDM/rubber/plastic structure that has a generally U-shaped body usually with a rigid metal core/carrier to provide strength and rigidity, and with deformable gripping arms extending inwardly into a cavity defined by the U-shaped body. In addition, lips typically extend outwardly from the weatherseal body for sealing engagement with the window and/or door and/or the vehicle body.

In recent years, a protrusion or mushroom-shaped bulbous mounting region is oftentimes provided and over which is mounted a bright strip/reveal. In order to maintain a secure connection between the reveal and the mounting region of the weatherseal body, the reveal is typically a roll-formed metal component such as stainless steel configured so that opposite edges are designed to grip undercut regions of the bulbous mounting region of the weatherseal body. Thus, the elongated edges of the reveal extend continuously and grip the elongated mushroom-shaped mounting region of the weatherseal body. A lubricating material is sometimes required on the mounting region to facilitate installation of the reveal over the EPDM/rubber material. Further, the tolerances are very tight and it can be challenging from an engineering standpoint to meet these tolerances and secure the reveal to the mushroom-shaped mounting region.

SUMMARY

A weatherseal assembly is adapted for receipt on an associated vehicle. The weatherseal assembly includes a weatherseal having a first attachment portion for securing the weatherseal to the associated vehicle, and a protrusion facing outwardly from the weatherseal. An elongated reveal is dimensioned for receipt over the weatherseal protrusion and faces outwardly from the vehicle when mounted thereon. The reveal has a substantially C-shape. A clip is dimensioned for interconnecting the reveal to the weatherseal protrusion, and the clip includes a retention portion that is movable between different, first and second positions such that in the first position, the retention portion has a first dimension when the reveal engages the clip, and in the second position, the retention portion has a different, second dimension when the reveal is engaged to the clip for securing the reveal to the weatherseal assembly.

The retention portion includes a flexible lip extending outwardly from a body of the clip.

The retention portion includes gripping portions spaced apart by the first dimension in the first position of the flexible lip, and spaced closer together in the second dimension defined by the second position of the flexible lip.

The gripping portions are dimensioned for receipt in an undercut of the weatherseal protrusion in both the first and second positions.

The clip further includes an opening therethrough and the gripping portions are disposed on opposite sides of the opening.

The opening through the clip forms a span along an edge of the opening that is selectively deformed in response to movement of the retention portion.

The opening through the clip is generally rectangular and the retention portion includes the flexible lip extending from the span in a direction away from the opening, and the first and second gripping portions extend inwardly into the opening.

The flexible lip has a terminal end that in an unstressed state extends outwardly from a remaining perimeter of the clip, and when engaged by the reveal is deformed and aligns with the remaining perimeter of the clip.

The weatherseal is at least one of an elastomeric, EPDM, rubber, or plastic material.

The weatherseal has an extrudable profile, and like clips are provided at spaced locations along a length of the weatherseal.

A method of securing a reveal to a weatherseal that includes a protrusion facing outwardly for receipt of an elongated reveal thereon is also disclosed herein. The method includes forming an elongated weatherseal that includes an attachment portion for securing the weatherseal to an associated vehicle, and a protrusion facing outwardly from the associated vehicle when the weatherseal is secured thereto. The method includes providing at least one clip that has a retention portion movable between different, first and second positions. The method includes providing an elongated reveal dimensioned for engaging receipt over the clip. The method includes moving the retention portion from the first position to the second position when the reveal is brought into engaging receipt with the clip.

The clip providing step includes forming a flexible lip that extends outwardly therefrom, the flexible lip deforming in response to engaging the reveal over the clip.

One advantage is the ability to effectively secure the reveal to the weatherseal.

Another benefit of the disclosure is the ability to eliminate a lubricant conventionally used to secure the reveal to the weatherseal.

Still another advantage resides in the ease of assembly of the reveal to the weatherseal.

Yet another benefit is associated with the ability to change the tolerances of the components during assembly of the reveal to the weatherseal.

A further advantage resides in the ability to reduce the step off (e.g., distance/dimension) between the window and the reveal where the reduced step off improves wind noise, aerodynamics, and perceived quality of manufacture.

Benefits and advantages of the present disclosure will become more apparent from reading and understanding the following detailed description.

DETAILED DESCRIPTION

Figure 1:
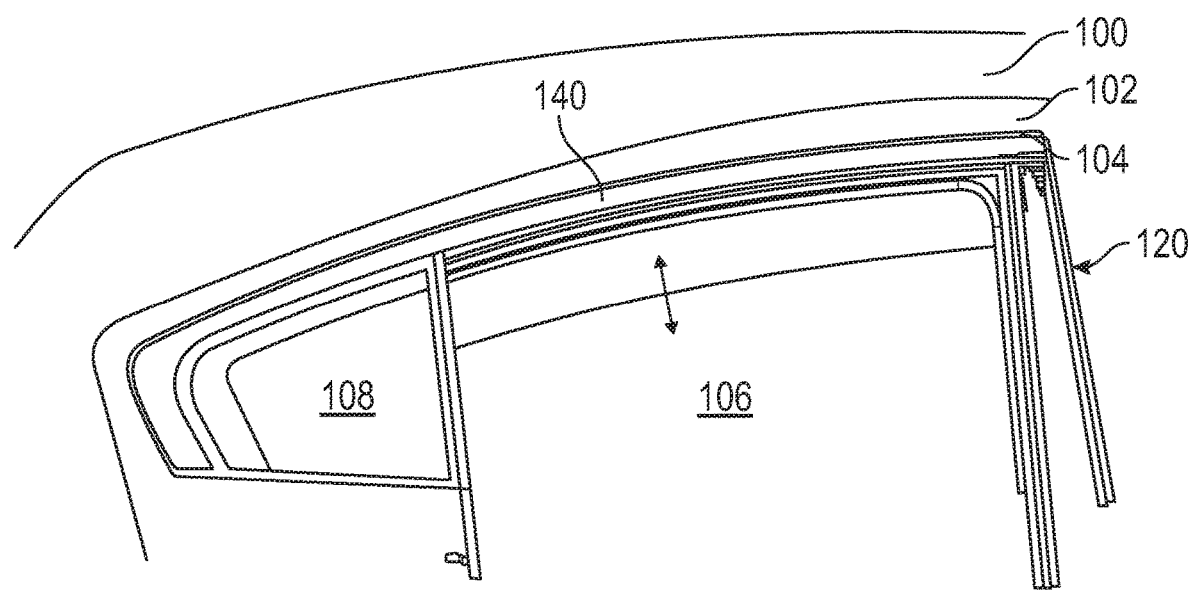
FIG. 1 shows a weatherstrip assembly as received on a vehicle.

FIG. 1 shows a portion of a vehicle 100 and including a vehicle door 102 that has an opening 104 dimensioned to receive at least one window 106 that moves up and down relative to the door opening. In addition, in the particular illustrated embodiment, the vehicle door 102 includes a second, fixed window 108.

Figure 2:
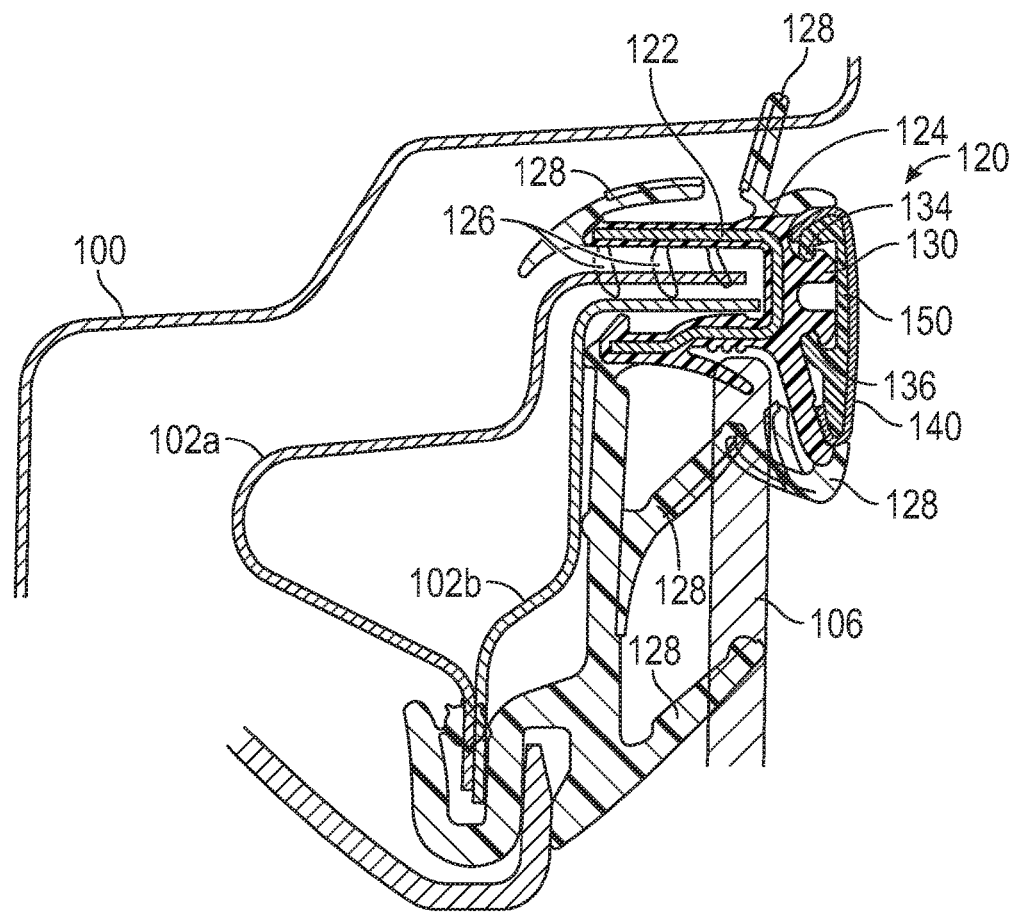
FIG. 2 is a cross-sectional view of a weatherstrip assembly taken generally along the lines 2-2 of FIG. 1.
Figure 3:
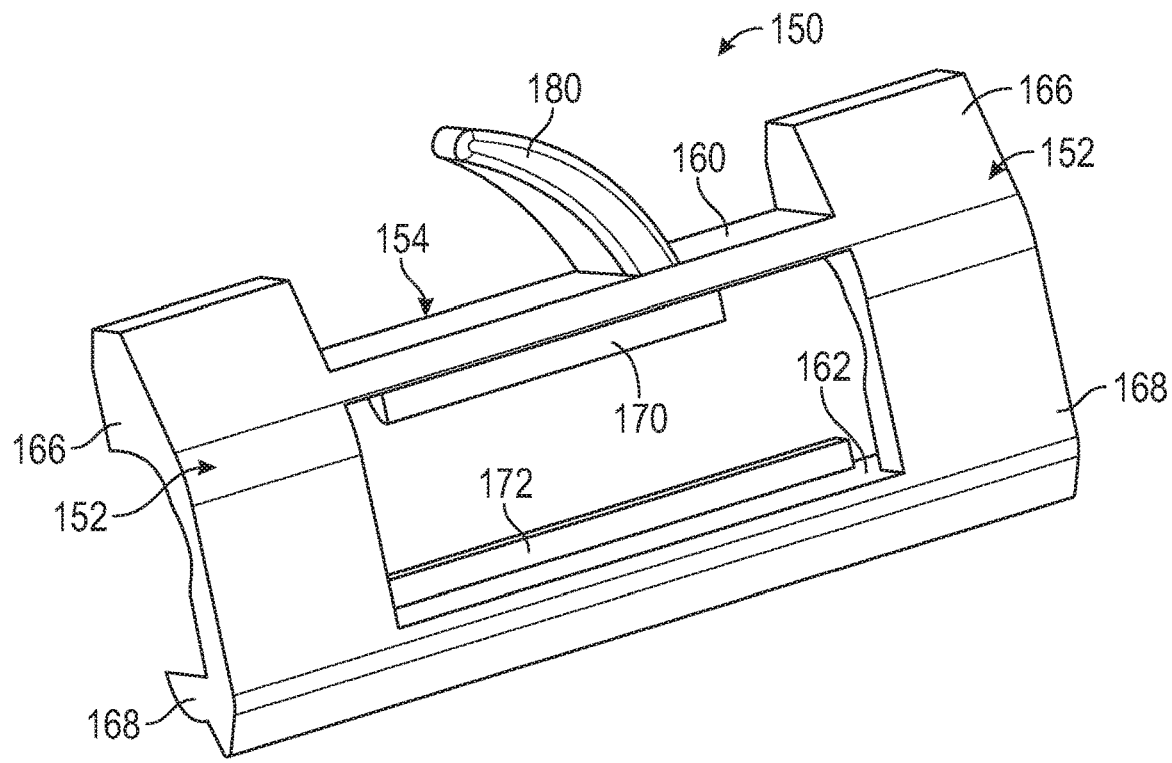
FIG. 3 is an isometric or perspective view of a bright strip retention clip of the present disclosure.
Figure 4:
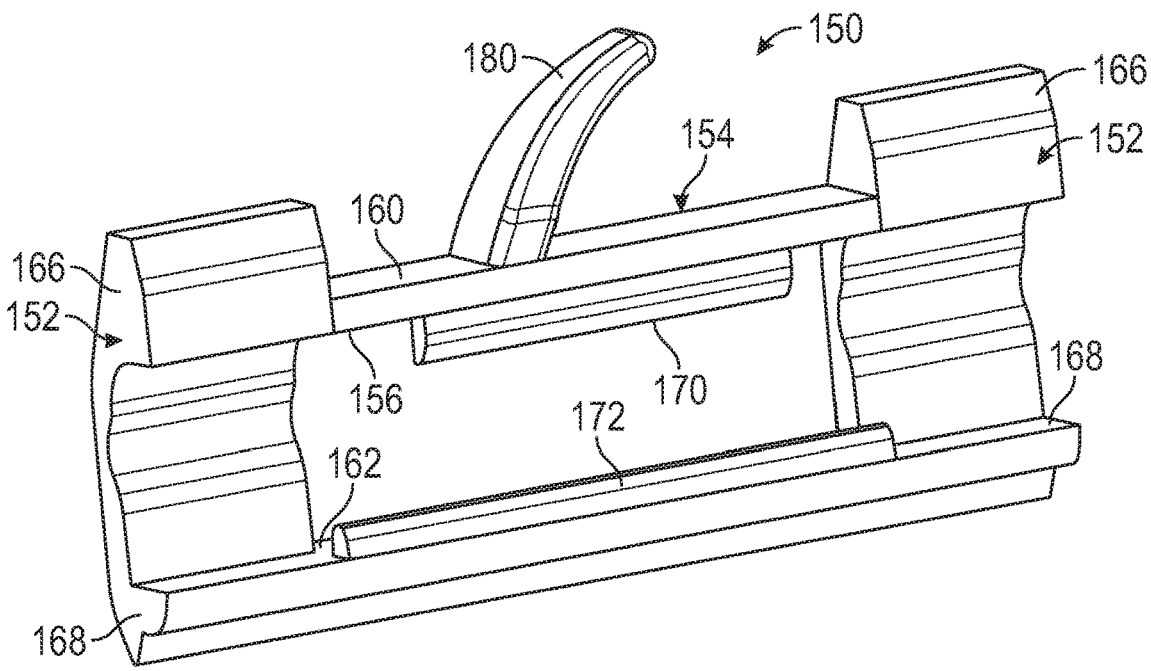
FIG. 4 is a perspective view of a rear portion of the bright strip retention clip of FIG. 3.
Figure 5:
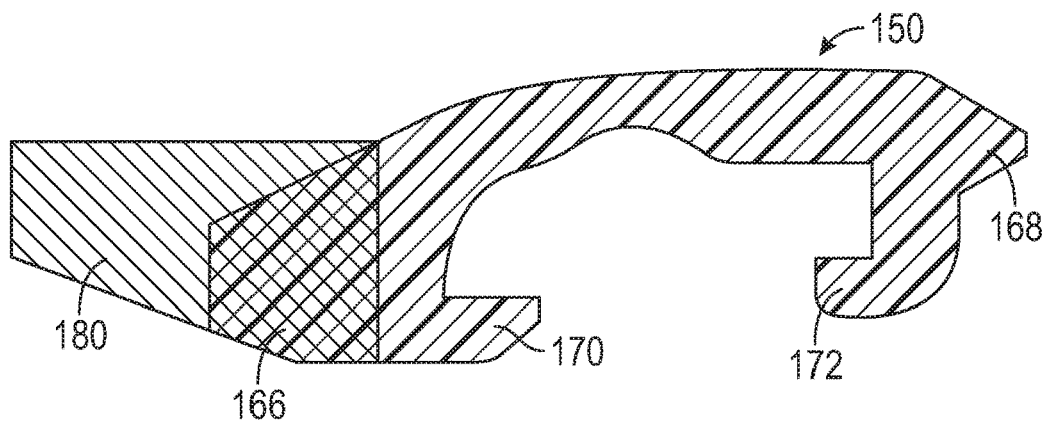
FIG. 5 is a cross-sectional view through one end of the clip taken generally along the lines 5-5 of FIG. 3.
Figure 6:
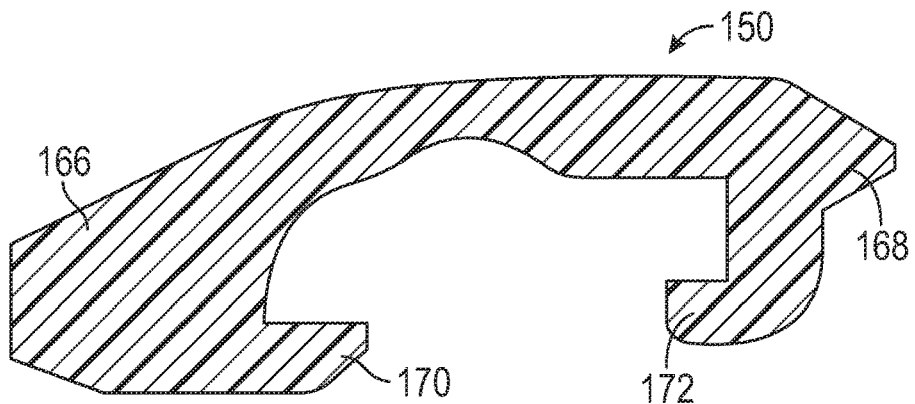
FIG. 6 is a cross-sectional view through a central portion of the clip taken generally along the lines 6-6 of FIG. 3.

A weatherstrip or weatherseal assembly 120 is secured to the vehicle 100, and particularly to the vehicle door 102. Thus, as seen with reference to a prior art arrangement shown in FIG. 2, the vehicle door 102 includes an inner door panel 102a and outer door panel 102b. The weatherseal assembly 120 includes a generally U-shaped carrier or core 122, commonly a roll-formed metal structure, that provides desired strength and rigidity to the weatherseal assembly. Coextruded around the core 122 is a weatherseal body 124 that includes one or more gripping fingers 126, for example, that extend inwardly into the U-shape of the gripping portion of the weatherseal body for engagement with the adjacent door flanges 102a, 102b. In addition, seal lips 128 are also preferably coextruded as a portion of the weatherseal body 124 for engagement with the door, window, vehicle body, etc.

It will be appreciated that the weatherseal body 124 may adopt a wide variety of conformations or configurations, and of particular interest here is the provision of a protrusion 130 that faces outwardly from the weatherseal body. The protrusion 130 has a generally bulbous, mushroom-shaped configuration, that is an enlarged head portion 132 with first and second undercut regions 134, 136 that extend along a longitudinal extent of the body. The protrusion 130 is adapted to receive a bright strip or reveal 140, typically a metal structure that includes roll-formed edges 142, 144 that are rolled inwardly for receipt in the undercut regions 134, 136, respectively, of the protrusion to provide a gripping, mechanical engagement of the reveal onto the protrusion.

The tolerances for securing the reveal 140 to the protrusion 130 of the weatherseal body 124 are very tight/stringent and it can be challenging to provide secure engagement between the reveal and the mushroom-shaped protrusion. To enhance engagement of the reveal 140 with the remainder of the weatherseal body 124, the present disclosure uses a bright strip retention clip assembly 150. Specifically, the weatherseal assembly 120 includes multiple clips 150 disposed in longitudinally spaced relation along the weatherseal body 124 to improve the engagement of the reveal 140 thereto. For example, three to five clips 150 may be used along the length of the front door header portion while another three to four clips may be used along the rear door header portion for securing the reveal 140 to the remainder of the weatherseal body 124, i.e., the bulbous, mushroom-shaped protrusion 130. It will be appreciated that the particular number of clips, and the spacing therebetween, may vary without departing from the scope and intent of the present disclosure.

Figure 7:
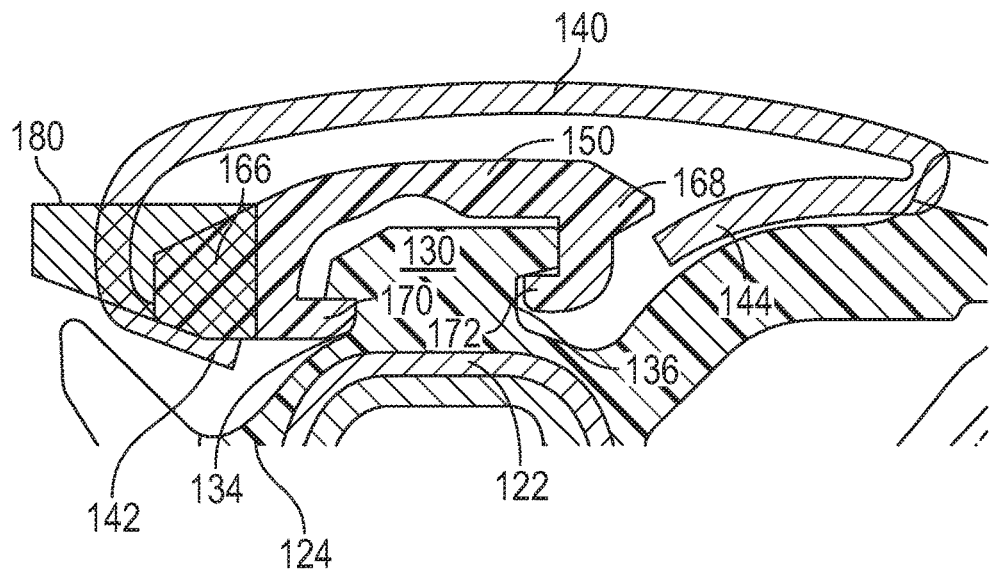
FIG. 7 is a cross-sectional view through the weatherstrip assembly and illustrates the components during an initial step of assembly.

An individual clip assembly 150 is shown in FIGS. 3-6. Each clip 150 is preferably a molded plastic structure. The clip 150 includes end support portions 152 at opposite first and second ends of the clip and a central securing portion 154 disposed between the first and second end support portions. The central securing portion 154 includes an opening 156 that forms an upper span 160 and a lower span 162 that interconnect the end support portions 152. In cross-section, each of the end support portions 152 has a generally C-shape with enlarged first and second shoulders 166, 168 that are dimensioned for receipt in an internal cavity defined by the roll-formed edges 142, 144 of the reveal 140. As shown in FIG. 7, the shoulders 166, 168 inhibit removal of the clip 150 from the cavity of the reveal 140. In addition, the clip 150 includes a retention portion that is movable between different, first and second positions. Specifically, the retention portion includes gripping portions or shoulders 170, 172, located on the upper and lower spans of the central securing portion, respectively, are received in the undercut regions 134, 136 of the mushroom-shaped protrusion 130.

To enhance the securing capabilities of the gripping shoulders 170, 172, a flexible spring lip 180 extends from one of the spans, and in this preferred embodiment the flexible spring lip extends outwardly (a first position of the spring lip) from the upper, first span 160. The flexible spring lip 180 engages the roll-formed edge 142 of the reveal 140 when the reveal is initially mounted over the clip 150 and the edge received in the undercut region 134 of the protrusion 130. As the opposite edge 144 of the reveal 140 is urged over the protrusion 130 and into the undercut region 136, the spring lip 180 is deflected or deformed (a second position of the spring lip) as a result of engagement with the reveal. This deflection/deformation of the spring lip 180, in turn, deflects the span 160 (from an undeflected, first position) toward the other span 162 whereby the dimension between the gripping shoulders 170, 172 is reduced (i.e., a second position of the spans/gripping shoulders), and the shoulders are advanced further into the respective undercut regions 134, 136 of the protrusion 130. As a result, the deflection of the spring lip 180 and likewise the deflection of the span 160 enhances the gripping action or mechanical lock of the gripping shoulders 170, 172 of the clip 150 onto the protrusion 130 of the weatherseal body 124.

Figure 8:
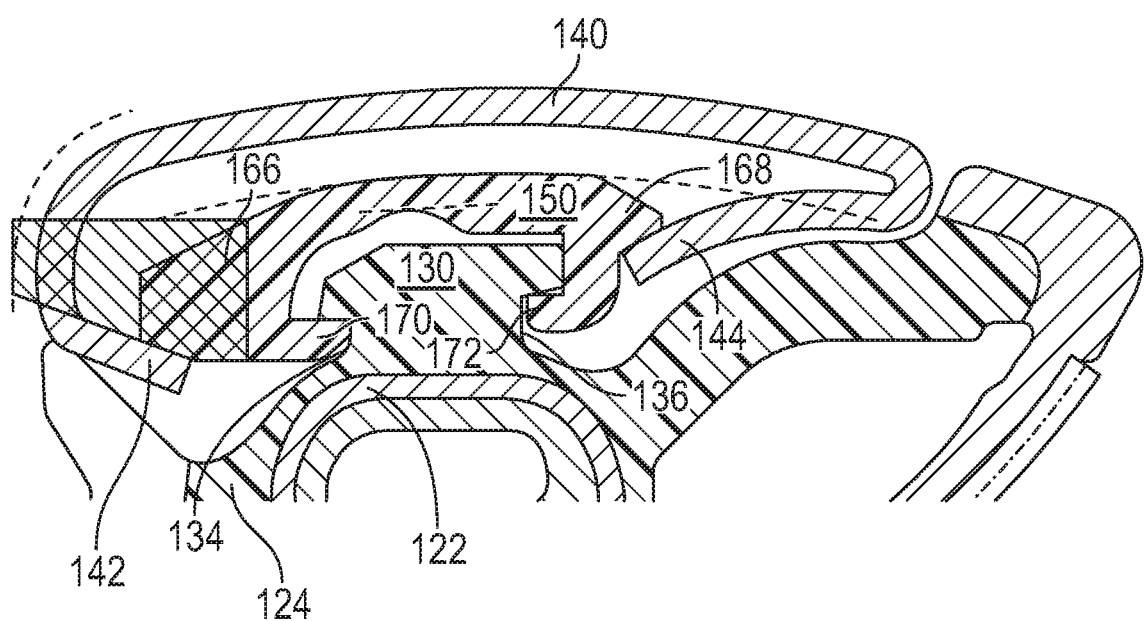
FIG. 8 is a cross-sectional view of the weatherstrip assembly and illustrating a final position of the components once assembly is complete.

The initial position of the clip 150 mounted on the protrusion 130 of the weatherseal body 124 is shown in FIG. 7. That is, individual clips 150 are mounted on to the extruded weatherseal body 124 for shipment from the manufacturer to the vehicle assembly plant. As is evident, the gripping shoulders 170, 172, of the clip are dimensioned for receipt over the clip 150, particularly, the gripping shoulders 170, 172 have sufficient contact with the clip 150 to retain the clip on the protrusion 130 of the extruded weatherseal body 124. It is also contemplated that the clip 150 may include at least one engagement member such as a barb (not shown) for engaging the weatherseal 120 to limit movement of the clip relative to the weatherseal during shipping. The spring lip 180 would be in a non-deflected position, and thus the gripping shoulders 170, 172 of the clip 150 are received in the undercut regions 134, 136, respectively, of the protrusion 130 of the weatherseal body 124. However, as the reveal 140 is advanced over the clip 150 (typically by installing the reveal edge 142 over the flexible spring lip 180), the spring lip is depressed/deformed as the opposite edge 144 of the reveal is advanced over the clip assembly, and the reveal mounted over the protrusion 130 via the clip. As the reveal 140 deforms the spring lip 180, the gripping shoulders 170, 172 of the clip bite into the undercut regions 134, 136 of the protrusion 130 (FIG. 8).

The enhanced mechanical lock of the gripping shoulders 170, 172 biting into the undercut regions 134, 136 of the protrusion 130 allow the lubricating material sometimes used on the protrusion of the weatherseal body to be eliminated. It is also contemplated that in the preferred arrangement, assembly would likely occur by an installer aligning a first end of the reveal 140 adjacent a pillar in the vehicle door 104, and then the reveal rocked or snapped into engagement over the clip 150 and over the mushroom-shaped protrusion 130, and the same installation action proceeding on to successive clips spaced longitudinally along the extent of the weatherseal assembly toward the other pillar. In this way, the reveal 140 is progressively snap-fit over the weatherseal assembly 124. As the spring lip 180 is depressed by the reveal 140, and the clip 150 bites into the protrusion 130, the assembly transforms from a loose tolerance that is associated with initial installation to a reveal/clip/mushroom-shaped protrusion geometry that tightens the tolerances during assembly. This results in a final assembly of the reveal 140 on the clip 150 and weatherseal protrusion 130 and an enhanced mechanical locking.

This written description uses examples to describe the disclosure, including the best mode, and also to enable any person skilled in the art to make and use the disclosure. Other examples that occur to those skilled in the art are intended to be within the scope of the invention if they have structural elements that do not differ from the same concept, or if they include equivalent structural elements with insubstantial differences.

It is claimed:

1. A weatherseal assembly for receipt on an associated vehicle, the weatherseal assembly comprising:
    a weatherseal including a first attachment portion for securing the weatherseal to the associated vehicle, and a protrusion facing outwardly from the weatherseal;
    an elongated reveal dimensioned for receipt over the weatherseal protrusion and facing outwardly from the vehicle when mounted thereon, the reveal having a substantially C-shape; and
    a clip that includes a generally rectangular opening therethrough forming a span along an edge of the opening that is configured to selectively deform, wherein the clip interconnects the reveal to the weatherseal protrusion, the clip further including a retention portion having spaced, first and second gripping portions disposed on opposite sides of the opening and a flexible lip extending from the span in a direction away from the opening, the first and second gripping portions configured for movement between different, first and second positions such that the reveal is received around the clip in the first position of the first and second gripping portions, and in the second position, the reveal is engaged to the clip and the reveal is secured to the weatherseal assembly.

2. The weatherseal assembly of claim 1 wherein the retention portion includes a flexible lip extending outwardly from a body of the clip.

3. The weatherseal assembly of claim 2 wherein the retention portion further includes gripping portions that are spaced apart by the first dimension in the first position of the flexible lip, and spaced closer together in the second dimension defined by the second position of the flexible lip.

4. The weatherseal assembly of claim 3 wherein the gripping portions are dimensioned for receipt in an undercut of the weatherseal protrusion in both the first and second positions.

5. The weatherseal assembly of claim 3 wherein the clip further includes an opening therethrough and the gripping portions are disposed on opposite sides of the opening.

6. The weatherseal assembly of claim 1 wherein the flexible lip has a terminal end that is configured so that in an unstressed state, the terminal end extends outwardly from a remaining perimeter of the clip, and when engaged by the reveal the terminal end is deformed and aligns with the remaining perimeter of the clip.

7. The weatherseal assembly of claim 1 wherein the weatherseal is at least one of an elastomeric, EPDM, rubber, or plastic material.

8. The weatherseal assembly of claim 1 further comprising additional clips provided at spaced locations along a length of the weatherseal.

9. The weatherseal assembly of claim 1 wherein the clip further comprises at least one engagement member for engaging the weatherseal to limit movement of the clip relative to the weatherseal during shipping.

10. A weatherseal assembly for receipt on an associated vehicle, the weatherseal assembly comprising:
    a weatherseal including a first attachment portion for securing the weatherseal to the associated vehicle, and a protrusion facing outwardly from the weatherseal;
    an elongated reveal dimensioned for receipt over the weatherseal protrusion and facing outwardly from the vehicle when mounted thereon, the reveal having a substantially C-shape; and
    a clip that interconnects the reveal to the weatherseal protrusion wherein the clip includes a generally rectangular opening therethrough forming a span along an edge of the opening that is configured to selectively deform, the clip further including spaced, first and second gripping portions disposed on opposite sides of the opening, the first and second gripping portions configured for movement between different, first and second positions such that the reveal is received around the clip in the first position of the first and second gripping portions, and in the second position, the retention portion includes a flexible lip extending outwardly from a body of the clip, the flexible lip having a terminal end that is configured so that in an unstressed state, the terminal end extends outwardly from a remaining perimeter of the clip, and when engaged by the reveal the terminal end is deformed and aligns with the remaining perimeter of the clip, and wherein the flexible lip has a terminal end that is configured so that in an unstressed state, the terminal end extends outwardly from a remaining perimeter of the clip, and when engaged by the reveal the terminal end is deformed and aligns with the remaining perimeter of the clip.

* * * * *